United States Patent [19]

Ito et al.

[11] Patent Number: 5,747,991
[45] Date of Patent: May 5, 1998

[54] CAPACITANCE TYPE ACCELERATION SENSOR

[75] Inventors: Natsuko Ito; Hiroyuki Okada, both of Tokyo, Japan

[73] Assignee: NEC Corporation, Tokyo, Japan

[21] Appl. No.: 541,266

[22] Filed: Oct. 12, 1995

[30] Foreign Application Priority Data

Oct. 27, 1994 [JP] Japan ................... 6-263757

[51] Int. Cl.⁶ ................................ G01P 15/125
[52] U.S. Cl. .................... 324/661; 324/685; 324/686; 73/514.23
[58] Field of Search ............. 73/514.32, 514.16, 73/514.35, 514.36; 324/658, 661, 684, 685, 686, 162

[56] References Cited

U.S. PATENT DOCUMENTS

| | | |
|---|---|---|
| 5,388,460 | 2/1995 | Sakurai et al. ............... 73/514.32 |
| 5,429,736 | 7/1995 | Shimada et al. .............. 73/514.32 X |
| 5,497,668 | 3/1996 | Okada .......................... 73/514.32 X |

FOREIGN PATENT DOCUMENTS

| | | | |
|---|---|---|---|
| 2700614 | 7/1994 | France | ........................ 73/514.32 |
| 2134570 | 5/1990 | Japan . | |
| 518990 | 1/1993 | Japan . | |

*Primary Examiner*—Michael Brock
*Attorney, Agent, or Firm*—Whitham, Curtis & Whitham

[57] ABSTRACT

The capacitance type acceleration sensor disclosed is one in which a variation in a distance between first and second electrodes caused by acceleration is measured as an electrostatic capacity variation. The acceleration sensor includes a fixed electrode, a movable electrode and a reference electrode. The fixed electrode constitutes the first electrode or the second electrode, and a movable electrode constitutes the other of the first or second electrodes. The reference electrode is such that its distance with respect to the first and second electrodes is not caused to be changed by acceleration. The fixed electrode and the movable electrode are disposed in an overlapping position in a direction in which the acceleration is detected. Thus, it is possible to scale down the sensor chip area by the magnitude of the area of the reference electrode.

9 Claims, 3 Drawing Sheets

5,747,991

CAPACITANCE TYPE ACCELERATION SENSOR

BACKGROUND OF THE INVENTION (1) Field of the Invention

The present invention relates to a capacitance type acceleration sensor for use in, for example, an air bag or mobile navigation system, and more particularly to a capacitance type acceleration sensor in which a variation in a distance between two oppositely disposed electrodes caused by acceleration is measured as an electrostatic capacity variation.

(2) Description of the Related Art

A capacitance type acceleration sensor is generally constructed such that, in addition to a movable electrode which undergoes a variation in distance with respect to a fixed electrode caused by acceleration, there is provided, for purposes of noise reduction, a reference electrode whose distance with respect to the fixed electrode does not change despite acceleration.

A first example of a conventional capacitance type acceleration sensor is shown in FIG. 1, in which a reference electrode 3 is provided in the same plane as that of a movable electrode 1 or a fixed electrode 2. With the electrostatic capacity between the reference electrode 3 and the fixed electrode 2 being used as a base point, the measurement of the magnitude of acceleration is made based thereon and from the magnitude of the electrostatic capacity between the movable electrode 1 and the fixed electrode 2. Then, even when there is an environmental change such as a temperature change, the base point of the distance between the related electrodes undergoes the same corresponding change, so that the drift of any offset caused by the temperature change becomes zero. Generally, the acceleration sensor having the reference electrode 3 is arranged such that a switched-capacitor circuit is used as a signal processing circuit and an AC current is applied thereto with the phases reversed respectively to the movable electrode and the reference electrode 3, whereby a difference between the electron charge between the movable electrode 1 and the fixed electrode 2 and the electron charge between the reference electrode 3 and the fixed electrode 2 is detected. Since the difference is detected with any noise of the same phase from the outside being eliminated, the system can withstand such noise.

Another conventional example of a capacitance type acceleration sensor is as shown in FIG. 2 in which two fixed electrodes 2 are provided one above and the other below a mass portion 5 and the acceleration is measured from a difference in respective electrostatic capacity values. In this acceleration sensor, as in the first example, the difference in the values is measured so that the off-set drift caused by a temperature change becomes zero and, with any in-phase noise being eliminated, the effect of withstanding environmental changes is enhanced.

There have been various problems in the above described conventional acceleration sensors. That is, in the first prior art example, an additional area is required because of the arrangement wherein the reference electrode is provided on the same plane as the movable electrode or the fixed electrode, and this prohibits scaling down of the sensor. In the second prior art example, it is required that precisely the same inter-electrode spacing be provided with respect to the upper and lower faces of the mass portion, and this results in requiring additional process steps in the fabrication.

SUMMARY OF THE INVENTION

An object of the present invention, therefore, is to overcome the problems existing in the prior art and to provide a capacitance type acceleration sensor which is not influenced by noise, and is compact and simple in its structure.

According to one aspect of the invention, there is provided a capacitance type acceleration sensor in which a variation in a distance between first and second electrodes caused by acceleration is measured as an electrostatic capacity variation, the sensor comprising:

- a fixed electrode which is stationary with respect to a stopper and which constitutes one of the first and second electrodes;
- a movable electrode which is stationary with respect to a mass section and which constitutes the other of the first and second electrodes; and
- a reference electrode whose distance with respect to the first electrode or the second electrode is not caused to be changed by acceleration, the fixed electrode, the movable electrode and the reference electrode being disposed in an overlapping position in a direction in which the acceleration is detected.

In the acceleration sensor according to the invention, as compared with the first prior art example, although an increase in the thickness of the structure in the direction in which the acceleration is detected is up to only on the order of several tens of micrometers (μm), it is possible to scale down the sensor chip area by the magnitude of the area of the reference electrode. Also, when an insulating film is used for forming the spacing with respect to the movable electrode or the fixed electrode, a stopper carrying the fixed electrode may be provided only at one surface of the mass portion. This permits the controlling of inter-electrode spacing with greater precision than in the case where the stopper bonding is involved as in the second prior art example.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention are explained with reference to the drawings.

Figure 1:
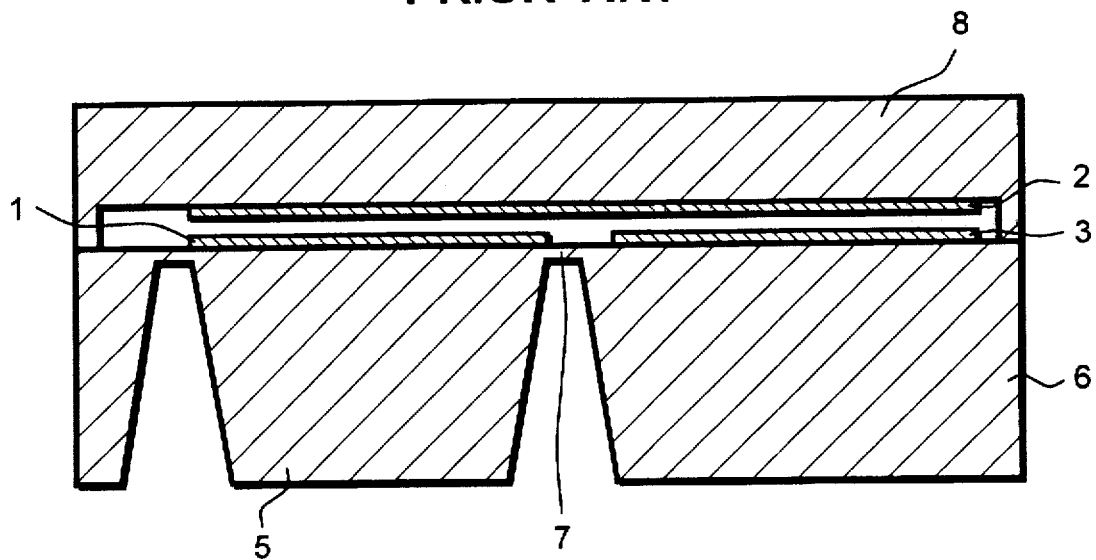
FIG. 1 is a sectional view showing a prior art capacitance type acceleration sensor.
Figure 2:
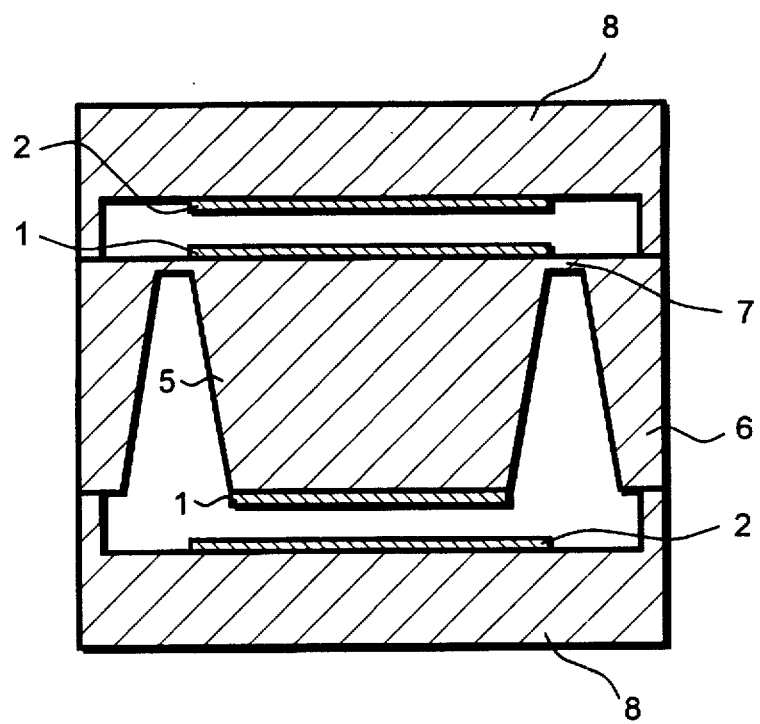
FIG. 2 is a sectional view showing a prior art capacitance type acceleration sensor.
Figure 3:
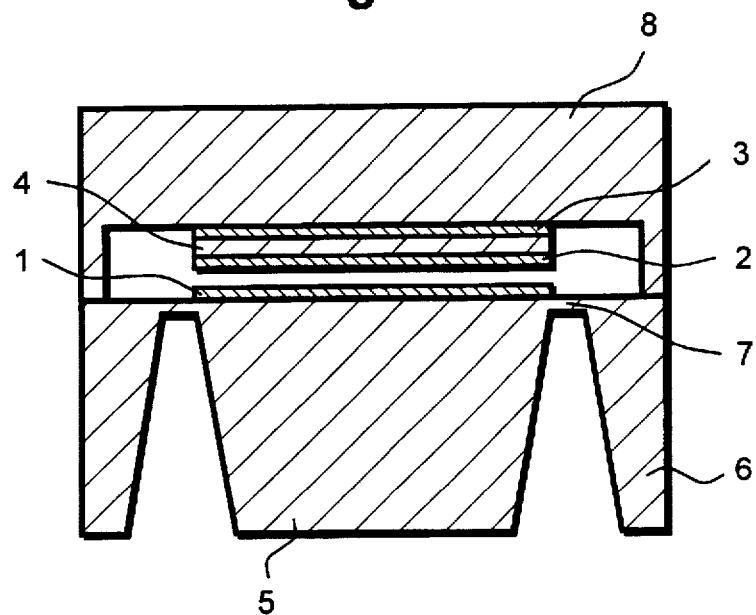
FIG. 3 is a sectional view showing a capacitance type acceleration sensor of a first embodiment according to the invention.

FIG. 3 shows, in a sectional view, an acceleration sensor of a first embodiment according to the invention. An anisotropic etching process using KOH (potassium Hydroxide) solution, hydrazine, etc. provides a structure having an Si (silicon) substrate with a mass section 5, a supporting section 6 and a thin film section 7. A movable electrode 1 of a metal film is formed on the mass section 5. In this capacitance type acceleration sensor, a stopper 8 is normally made by processing an insulating material such as glass, and a reference electrode 3 of for example metal, is formed at a location where this electrode 3 faces the movable electrode 1. The insulating film 4 is formed of the same material as the stopper 8 or an insulating material having the same thermal expansion coefficient as that of the stopper 8, and the fixed electrode 2 is formed so as to face the movable electrode 1. It is desirable that the thickness of the insulating film 4 be the same as the distance between the movable electrode 1 and the fixed electrode 2. When there is an acceleration in the direction of the arrow shown in the drawings, the thin film section 7 whose one end is fixed and supported by the supporting portion 6 bends so that the mass section 5 is displaced with respect to the supporting section 6. Since the fixed electrode 2 is fixed with respect to the supporting section 6, with the value of the electrostatic capacity between the fixed electrode 2 and the reference electrode 3 used as a reference value, the displacement of the mass section 5 is measured from a variation of the electrostatic capacity between the movable electrode 1 and the fixed electrode 2, whereby the magnitude of the acceleration is measured. Even when a temperature change occurs in the acceleration sensor, where the thermal expansion coefficient of the insulating film 4 and that of the stopper 8 are the same, the ratio of the distance between the movable electrode 1 and the fixed electrode 2 to the distance between the fixed electrode 2 and the reference electrode 3 does not change, thereby permitting the detection of only a change in the distance between the movable electrode 1 and the fixed electrode 2 caused by the acceleration.

Figure 4:
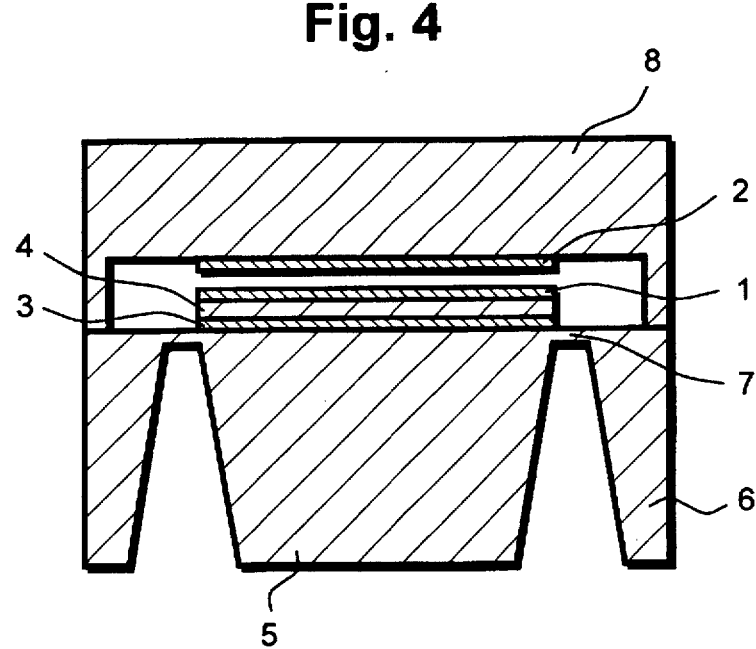
FIG. 4 is a sectional view showing a capacitance type acceleration sensor of a second embodiment according to the invention.

FIG. 4 shows a structure of a second embodiment according to the invention, wherein, as compared with the first embodiment, the position of the fixed electrode 2 and the movable electrode 1 with respect to the reference is in an opposite relation. That is, a three-layer structure consisting of the reference electrode 3, the insulating film 4 and the movable electrode 1 in this sequence 1 is provided on the mass section 5.

Where the material of the insulating film 4 is selected from materials having the same temperature coefficient of relative dielectric constant as the material constituting the spacer between the movable electrode 1 and the fixed electrode 2, it is possible to make a further suppression of the drift of the off-set caused by a temperature change.

Figure 5:
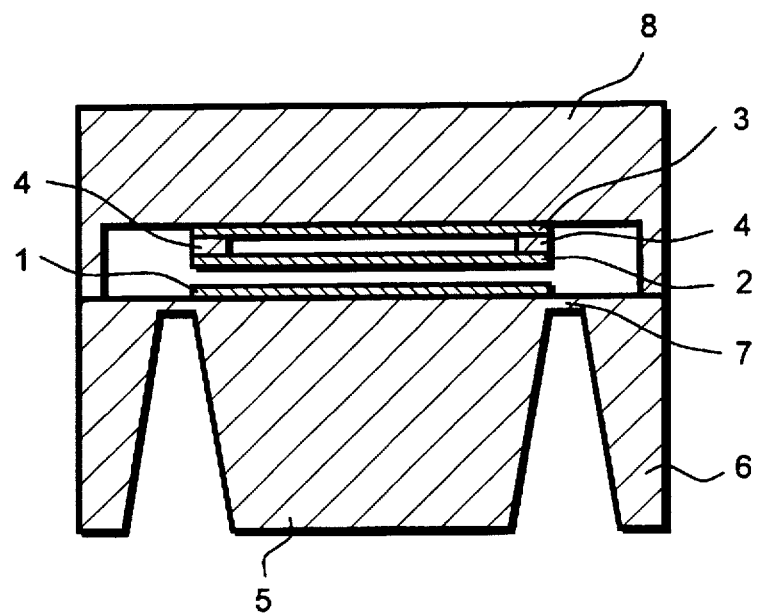
FIG. 5 is a sectional view showing a capacitance type acceleration sensor of a third embodiment according to the invention.

FIG. 5 shows a structure of a third embodiment according to the invention, whose feature is that the insulating film 4 has a sufficient width to maintain a spaced portion between the fixed electrode 2 and the reference electrode 3, and a large part of the spaced portion is formed of the same material constituting the spacer between the movable electrode 1 and the fixed electrode 2. Even when the temperature change occurs in the acceleration sensor, as in the first embodiment, since there is no change in the ratio of the distance between the movable electrode 1 and the fixed electrode 2 and the distance between the fixed electrode 2 and the reference electrode 3, it is possible to detect only a change in the distance between the movable electrode 1 and the fixed electrode 2 caused by the acceleration. Also since the values of the temperature coefficient of relative dielectric constant are the same among the respective electrodes, the drift of the off-set caused by a temperature change can be suppressed so as to be very small.

As explained above, since the movable electrode and the fixed electrode are overlapping in the direction in which the acceleration is detected, then, although an increase in the thickness of the structure in the direction in which the acceleration is detected is only on the order of several tens μm, it is possible to scale down the sensor chip area by the magnitude of the area of the reference electrode. Normally, since, in order to facilitate the simplification of detection circuitry, the area of the reference electrode and that of the movable electrode are formed such that the areas are the same, the sensor area according to the invention is decreased to ⅔ of that in the prior art structure. Further, by using the insulating film for the spacing between the reference electrode and the movable electrode, it is possible to accurately control the inter-electrode distance. Also, it is possible to omit some process steps involving the stopper formation and bonding, which can be a major cause for the lowering of production yield.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A capacitance type acceleration sensor comprising:
   a fixed electrode which is stationary with respect to a stopper and which constitutes one of a first and a second electrodes;
   a movable electrode which is stationary with respect to a mass section and which constitutes the other of said first and second electrodes; and
   a reference electrode whose distance with respect to one of said first and second electrodes is not caused to be changed by acceleration;
   an insulating film disposed between said fixed electrode and said reference electrode, said insulating film having the same thermal expansion coefficient as that constituting said stopper,
   said fixed electrode, said movable electrode and said reference electrode being disposed in an overlapping position in a direction in which said acceleration is detected.

2. A capacitance type acceleration sensor comprising:
   a fixed electrode which is stationary with respect to a stopper and which constitutes one of a first and a second electrodes;
   a movable electrode which is stationary with respect to a mass section and which constitutes the other of said first and second electrodes; and
   a reference electrode whose distance with respect to one of said first and second electrodes is not caused to be changed by acceleration;
   an insulating film disposed between said fixed electrode and said reference electrode, said insulating film being of an insulating material having a width sufficient to define a spaced portion between said fixed electrode and said reference electrode,
   said fixed electrode, said movable electrode and said reference electrode being disposed in an overlapping position in a direction in which said acceleration is detected.

3. A capacitance type acceleration sensor comprising:
   a fixed electrode which is stationary with respect to a stopper and which constitutes one of a first and a second electrodes;
   a movable electrode which is stationary with respect to a mass section and which constitutes the other of said first and second electrodes; and a reference electrode whose distance with respect to one of said first and second electrodes is not caused to be changed by acceleration;

an insulating film disposed between said movable electrode and said reference electrode, said insulating film being of an insulating material having the same thermal expansion coefficient as that constituting said stopper, said fixed electrode, said movable electrode and said reference electrode being disposed in an overlapping position in a direction in which said acceleration is detected.

4. A capacitance type acceleration sensor comprising:

a fixed electrode which is stationary with respect to a stopper and which constitutes one of a first and a second electrodes;

a movable electrode which is stationary with respect to a mass section and which constitutes the other of said first and second electrodes; and a reference electrode whose distance with respect to one of said first and second electrodes is not caused to be changed by acceleration;

an insulating film disposed between said movable electrode and said reference electrode, said insulating film being of an insulating material having a width sufficient to define a spaced portion between said movable electrode and said reference electrode, said fixed electrode, said movable electrode and said reference electrode being disposed in an overlapping position in a direction in which said acceleration is detected.

5. A capacitance type acceleration sensor in which a variation in a distance between a first and a second electrode caused by acceleration is measured as an electrostatic capacity variation, comprising:

a stopper member;

a fixed electrode mounted stationary with respect to the stopper member and which constitutes one of said first and second electrodes;

a movable electrode, which constitutes the other of said first and second electrodes, mounted on a mass mounted to the stopper by a first mounting means such that, in the absence of an acceleration, said movable electrode is spaced a first distance from said fixed electrode, and in the presence of an acceleration said first distance changes, wherein the first distance changes proportional to temperature;

a reference electrode, forming a capacitor with respect to at least one of said fixed and movable electrodes, mounted by a second mounting means to be a second distance with respect to one of said first and second electrodes, so that the second distance is not changed by an acceleration that changes said first distance, wherein the second mounting means is structured so that the second distance changes proportional to temperature, substantially the same as the first distance changes proportional to temperatured, thereby compensating for temperature changes by equalizing temperature induced variations in said first and second distances, said first mounting means and second mounting means arranged such that said fixed electrode, said movable electrode and said reference electrode are in an overlapping position in a direction in which said acceleration is detected.

6. A capacitance type acceleration sensor according to claim 5 wherein, in the absence of acceleration, the second distance is substantially equal to the first distance.

7. A capacitance type acceleration sensor according to claim 5 wherein said movable electrode has a first diameter and said reference electrode has a second diameter substantially equal to said first diameter.

8. The capacitance type acceleration sensor according to claim 5, in which said reference electrode is fixed to said stopper.

9. The capacitance type acceleration sensor according to claim 5, in which said reference electrode is fixed to said mass section.

* * * * *